March 9, 1926.  1,576,057
R. LIEFKE
FLUID CONTROL APPARATUS
Filed June 10, 1925  2 Sheets-Sheet 1
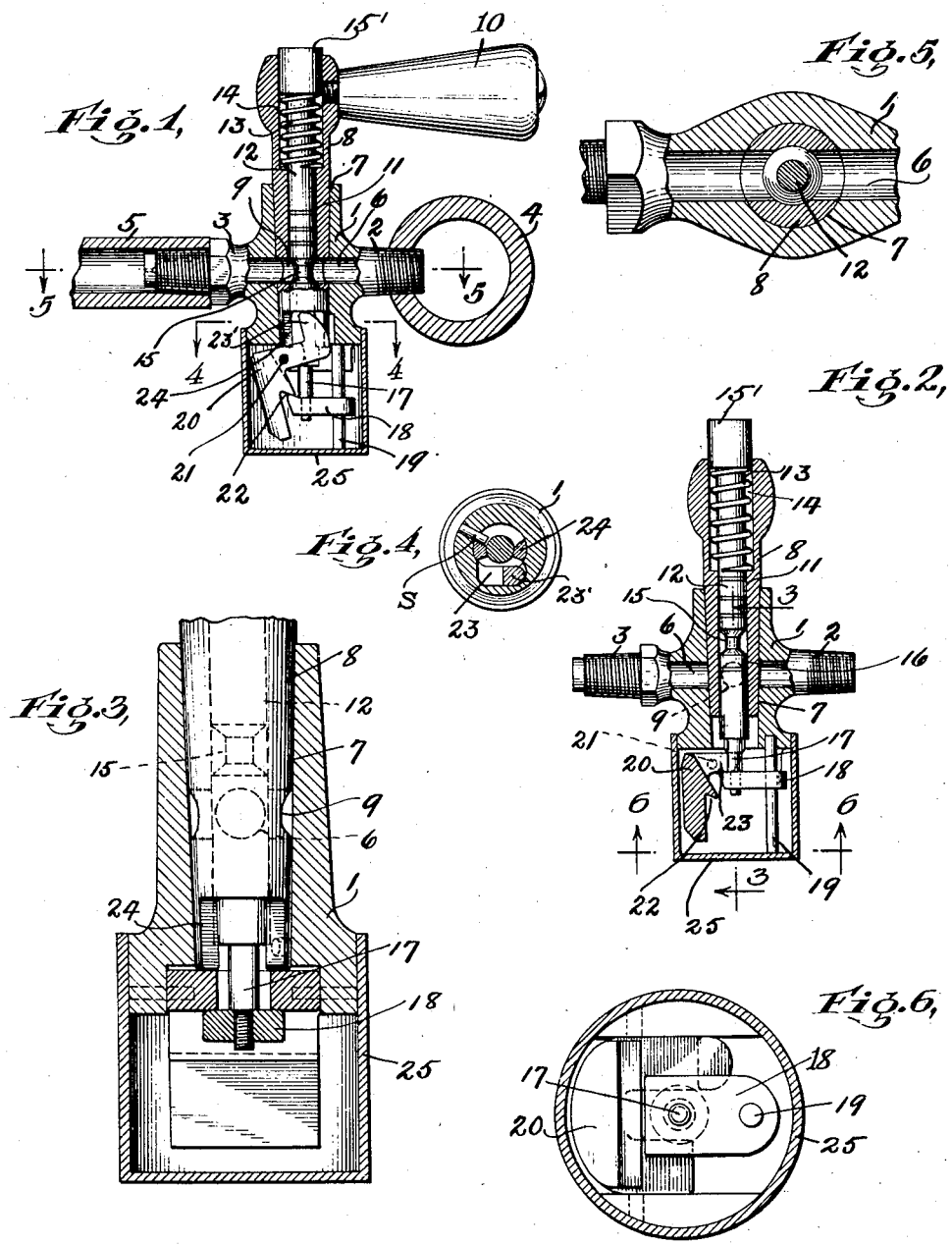
INVENTOR
Rudolf Liefke
BY
Kiddle and Marqueson
ATTORNEYS March 9, 1926.
R. LIEFKE
1,576,057
FLUID CONTROL APPARATUS
Filed June 10, 1925     2 Sheets-Sheet 2
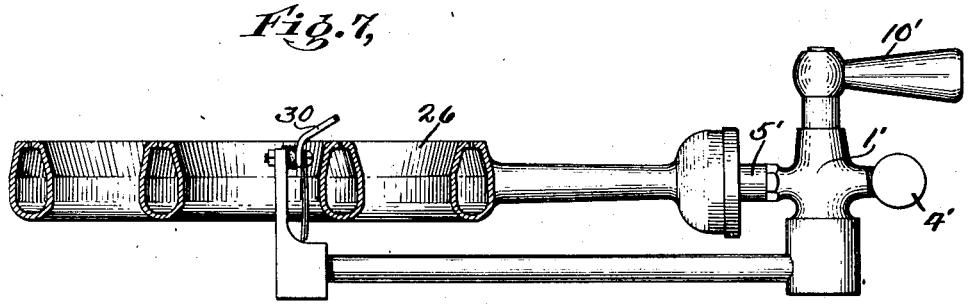
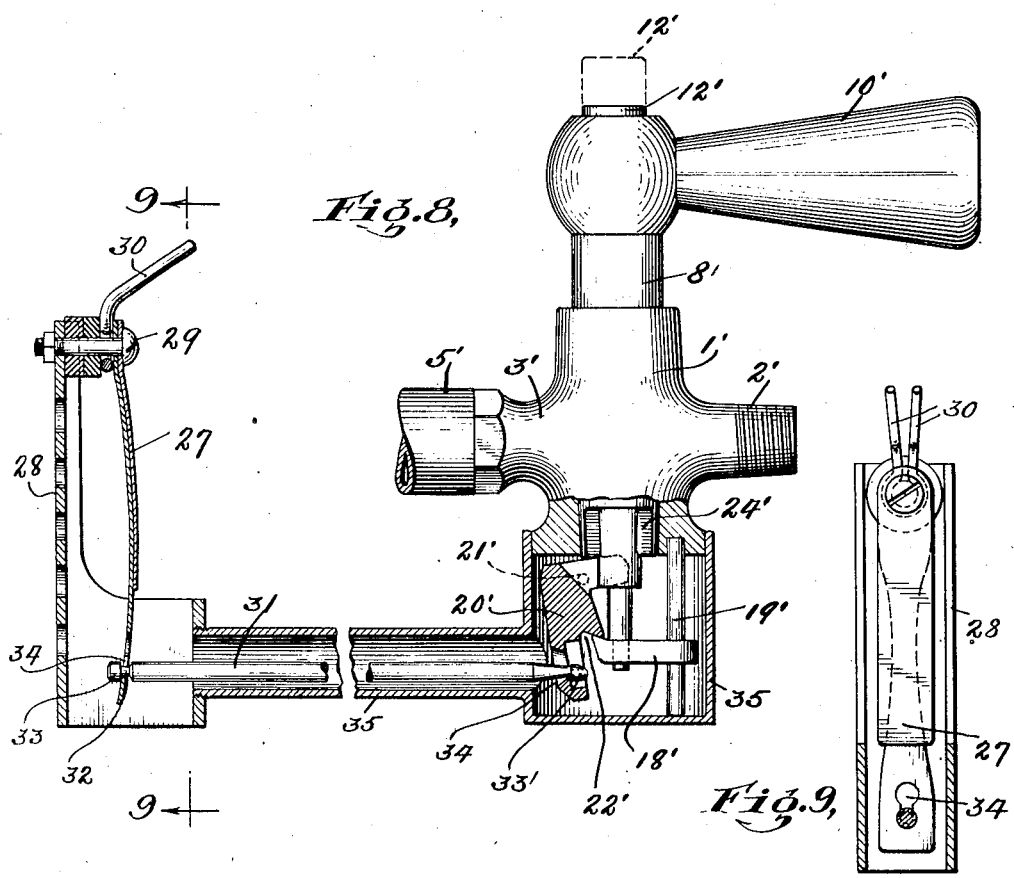
INVENTOR
Rudolf Liefke
BY
ATTORNEYS Patented Mar. 9, 1926.

1,576,057

UNITED STATES PATENT OFFICE.

RUDOLF LIEFKE, OF NEW YORK, N. Y., ASSIGNOR TO R. LIEFKE & COMPANY, A CO-PARTNERSHIP CONSISTING OF RUDOLF LIEFKE, ROBERT ADELMANN, AND ROBERT E. LEYENDECKER, ALL OF NEW YORK, N. Y.

FLUID-CONTROL APPARATUS.

Application filed June 10, 1925. Serial No. 36,093.

*To all whom it may concern:*

Be it known that I, RUDOLF LIEFKE, a citizen of the Republic of Germany, and a resident of New York city, in the county of New York and State of New York, have invented a certain new and useful Improvement in Fluid-Control Apparatus, of which the following is a specification.

My invention relates to devices for controlling the flow of gas or other fluids and has for one of its objects the provision of an extremely simple device so constructed and arranged that the accidental turning on of a gas supply, for example, is prevented. I have also provided a construction whereby, should the gas or other fluid being supplied through my device be extinguished accidentally, the flow of fluid thereafter is automatically prevented.

A further object of my invention is the provision of a device of the character indicated, wherein in certain types of installations a thermostat is attached thereto whereby, should the gas or other fluid be extinguished accidentally, the valve controlling the flow of the fluid is automatically closed.

In the accompanying drawings I have illustrated two embodiments of my invention, one embodiment being illustrative of an installation to a range, while the other, which is thermostatically controlled, is more suitable for water heaters and the like and for commercial plants using fluid fuel.

In the drawings—

Fig. 1 is a sectional elevational view of my improved device with the valve thereof in open position;

Fig. 2 is a sectional elevational view similar to Fig. 1, with the valve in closed position;

Fig. 3 is a section taken on the line 3—3 of Fig. 2;

Fig. 4 is a section on the line 4—4 of Fig. 1;

Fig. 5 is a section through Fig. 1 taken on the line 5—5;

Fig. 6 is a section on the line 6—6 of Fig. 2;

Fig. 7 is an elevational view of my improved apparatus thermostatically controlled;

Fig. 8 is an enlarged view partly in section of the apparatus of Fig. 7; and

Fig. 9 is a section along the line 9—9 of Fig. 8.

Referring to the drawings in detail and first of all to Figs. 1 to 6 inclusive, 1 designates a valve casting provided with threaded lateral extensions 2 and 3, respectively, the extension 2 being adapted to be screwed into a supply pipe 4, a gas supply pipe, for example, connected in the ordinary way to a supply tank, while the extension 3 is adapted to be attached to a pipe 5 leading to a burner not shown. I may here mention again that this device is well adapted for household use on ranges, water heaters, and other household or domestic appliances, it being understood, however, that it has other applications, as will be apparent to those skilled in this art.

The casting 1 is bored transversely, that is to say, lengthwise of the lateral extensions 2 and 3, so as to provide a port 6, connecting pipe 4 to pipe 5.

The casting 1 is bored transversely of the port 6, as indicated at 7, for the reception of a rotary valve 8, the movement of which is limited by a stop S. This valve controls the port 6, being provided with a port 9, which when the valve is in the position of Fig. 1 will open the port 6, it being understood, of course, that when the valve 8 is rotated 90° from this position by means of a handle 10 provided for that purpose, the port 6 will be closed off as indicated in Fig. 2.

As pointed out above, it is one of the objects of my invention to provide means whereby the accidental turning on of the fluid being controlled is avoided. In other words, it is an object of my invention to provide means whereby, should the valve handle 10 be moved accidentally to open position (the position of Fig. 1) the port 6 will remain closed or blocked off.

The valve 8 is bored centrally and longitudinally, as indicated at 11, for the reception of a valve plug 12, this plug being normally held in the position shown in Fig. 2, by means of a spring 13, this spring lying in an enlarged portion 14 of the bore 11 and surrounding the plug at the upper end thereof, the plug being headed for this purpose as indicated at 15'. This valve plug adjacent the lower end, that is to say, at a point adjacent the ports 6 and 9, is provided with a reduced portion or port 15, or it may be bored transversely instead of being reduced, so that when the plug is pushed downwardly to the position of Fig. 1, gas or other fluid being controlled is free to flow either past or through the plug, depending upon whether 15 is a reduced portion or is a bore.

When the plug 12 is in its outward position, that is to say, in the position of Fig. 2, the port 9 in the valve as well as the port 6 is closed off by that portion of the plug lying below the contracted portion 15, and which portion is designated 16. The plug 12 is provided with an extension, designated 17, at its lower end, this extension being screwed into or otherwise attached to a keeper 18 conveniently guided on a rod 19 fixed to the base of the valve casting 1.

Pivoted to the valve casting is a bell crank lever or latch 20, this member being pivoted at 21, and one arm thereof being provided with a notch 22, which under certain conditions is adapted to be engaged by the keeper 18 to prevent vertical movement of the plug 12.

The latch 20 is so pivoted that the lower end thereof has a tendency to swing to the right, as viewed in Fig. 1, into the path of the keeper 18. As before mentioned, the latch 20 is in the form of a bell crank lever, and the arm 23 thereof is provided with a head 23', and this head is adapted to be engaged by a cam 24, which is provided on the lower end of the valve 8 when the handle 10 is actuated to rotate this valve, the cam 24 at that time striking the head 23' on the arm 23 of the bell crank to rock the latch, that is to say, the lower arm thereof, to the left as viewed in Fig. 1. thereby releasing the keeper 18.

In operation, assuming that the valve 8 has been moved by the handle 10 to the position it occupies in the illustration of Fig. 2, the valve plug 12 will under those conditions be in its raised position, having been moved to that position by its spring 14. With the parts in this position, therefore, fluid is unable to flow from the pipe 4 to the pipe 5, being blocked off by the valve 8. Assuming now that by accident instead of by design the handle 10 is actuated to rotate the valve 8 for a part of a turn, or even to the position shown in Fig. 1, this movement will, of course, have moved the valve to position whereby it no longer blocks the port 6, yet gas or other fluid cannot flow, for the reason that the plug 12 is still in its raised position, and hence the passage from the pipe 4 to the pipe 5 is blocked by the plug. The head 15' of the plug 12 may now be pressed by the thumb or finger to force the valve plug 12 downwardly against the action of its spirng, this movement of the plug not only moving the port 15 to open position, but also carrying the keeper 18 downwardly past the notch 22 in the latch, so that when pressure is removed from the plug 12 the same is held against upward movement by the latch. Fluid is now free to flow from the pipe 4 to the pipe 5, and the parts will remain in this position until the handle 10 is actuated again to rotate the valve 8 toward closed position until the cam 24 on the lower end of the valve engages the head 23' of the latch arm, the engagement of this cam with the latch rocking the latch about its pivot to carry the notch 22 out of engagement with the keeper 18, whereupon the valve plug 12 will spring upwardly under the action of its spring 14 to close off the port 6. I might say at this point that the cam 24 is so designed as to enable the valve stem 8 to be moved to almost closed position before the latch is released, or, to be exact, before the keeper 18 is released from the latch, thereby permitting the flow of fluid to be reduced to a minimum, if desired, before it is shut off entirely.

It will be seen, therefore, that in the embodiment of my invention just described I have provided an apparatus whereby accidental turning on of the gas, that is to say, opening of the port 6, is prevented, inasmuch as the mere operation of the handle 10 will not open this port, it being necessary to also actuate the valve plug 12, and owing to the location and positioning of this plug with reference to the entire mechanism, this plug cannot be actuated unless intentionally and by design. It will be seen also that in turning off the gas or other fluid being controlled, despite the provision of the safety feature, the only operation necessary is the actuation of the handle 10, this movement of the handle to almost closed position automatically releasing the plug 12 to allow the same to close.

To protect the mechanism in the lower part of my improved apparatus and prevent tampering therewith, I provide a casing 25 therefor.

The construction employed in the embodiment of my invention as illustrated in Figs. 7, 8 and 9 is similar to the construction just described, being equipped, however, with an additional control in the form of a thermostat or other temperature-controlled device. The internal mechanism of this form of my invention therefore has not been illustrated in detail, being the same as that illustrated in Fig. 1, for example.

Referring to this embodiment of the invention, 1' designates a valve casting provided with lateral extensions 2' and 3', the extension 2' being in use screwed into supply pipe 4', while the extension 3' is attached to a pipe 5'. The pipe 5' is in turn attached to a burner illustrated more or less diagrammatically and designated 26.

From Fig. 8 it will be seen that the lower end of the valve plug 12' is provided with a keeper 18', conveniently guided on a guide rod 19', this keeper co-operating with a notch 22' in a latch 20', pivoted as indicated at 21' to the lower end of the valve casing or casting 1'. The pivot of the latch 20' is so located that the latch always tends to move inwardly toward the keeper 18'. It is to be understood that the casing 1' is provided with a rotary valve 8', operable by a handle 10', and that the valve plug 12' is adapted to be actuated to the dotted line position of Fig. 8 by means of a spring similar to the spring 14 shown on Fig. 1. The lower end of the valve 8' is provided with a cam 24' corresponding to the cam 24 of Fig. 1 and co-operating with the latch 20'.

The temperature-control device or thermostat provided in this embodiment of my invention is shown in detail in Fig. 8 and comprises a thermostatic strip 27, which is conveniently attached to a support 28 by a screw or other fastening 29, this screw also serving as securing means for heat-conducting member 30, the end of which is close to the burner 26, whereby heat is conducted to the thermostatic strip 27. The free end of the strip 27 is attached to a rod 31, the rod being provided with a contracted portion or neck 32 and with a head 33, the strip 27, as illustrated in Fig. 9, being provided with a keyhole slot 34 for the ready attachment of the rod 31 to the strip, it being merely necessary to push the rod into the enlarged end of the slot and allow the neck 32 to drop down to the bottom of the slot, as will be understood.

The opposite end of the rod 31 is provided with a head or hook 33' adapted to be inserted into the lower end of one arm of the latch 20', the latter being provided with an opening 34 for this purpose. The parts in use are positioned as shown in the drawing, so that the rod 31, while it may be readily disconnected from the latch 20' and from the thermostat 27, will nevertheless remain in place. The lower part of the valve casing 1' and the rod 31 are enclosed in a casing 35, which prevents tampering with the internal mechanism of the device. The sleeve of the casing 35 receives and supports the bracket or support 28 for the thermostatic strip 27.

It will be seen that this embodiment of my invention possesses all of the advantages of the embodiment illustrated in Figs. 1 to 6 and has the further advantage of thermostatic or temperature control, and it will be understood that in the event that the gas—if gas is being employed—is extinguished at the burner 26, the cooling off of the strip 27 will actuate the rod 31 to rock the latch 20' about its pivot 21' until it disengages the keeper or bolt 18', whereupon the valve plug 12' will automatically move upwardly to shut off the supply of gas to the burner. On the next operation of the plug 12' it is merely necessary to hold the plug down for a moment until the thermostat strip has heated sufficiently to permit the lower end of the latch 20' to swing inwardly into position to latch the keeper 18'.

This device is very valuable for use in connection with water heating devices in households, for instance, particularly private houses, where the heater is usually located in the basement, or it is adapted, of course, for use on a range, for example, or may be applied to burners of any kind, that is to say, burners employing oil, gas, or other fluid for fuel.

It is to be understood that while I have shown a specific embodiment of the invention, changes may be made in the details of construction and arrangement of parts within the spirit and scope of the invention.

What I claim is:

1. A device of the class described comprising a rotary valve provided with a port, a valve plug extending through said valve and controlling said port, a latch engageable with said plug for holding said plug in open position when the valve is in open position, and a cam operable by said valve for releasing said latch when the valve is moved toward closed position.

2. A device of the class described comprising a valve body ported transversely, a rotary valve provided with a port adapted upon rotation of the valve to register with the port in the valve body, a plug movable longitudinally of said valve and provided with a port adapted to register with the port in the said valve, a pivoted latch controlled by the valve for holding the plug in registering position, and a spring for moving said plug out of such position upon rotation of the valve.

3. A device of the class described comprising a valve body provided with a transverse port, a rotary valve ported transversely for controlling the flow of fluid through the port first mentioned, a cam on the inner end of said valve, a valve plug extending through said valve and movable longitudinally thereof, a pivoted latch adjacent the lower end of said plug and adapted to hold the plug in open position when the valve is in open position, said latch being controlled by said cam, whereby the latch will be released when the valve is moved toward closed position.

4. A device of the class described comprising a ported valve body or casing, a rotary valve passing through said body and provided with a port adapted to be moved into register with the port in the valve body upon rotation of said valve, a valve plug passing through said valve and slidable relatively thereto and provided with a port adapted when the plug is pushed inwardly to register with the ports in the valve and body, a keeper carried on the inner end of said plug, a latch pivoted to the valve body and engageable with said keeper for holding the plug in port-registering position, and a cam carried by said valve and engageable with said latch for forcing the same to plug releasing position.

5. A device of the class described comprising a ported valve body, a rotary ported valve carried thereby, a valve plug within said rotary valve and movable longitudinally thereof and provided with a port adapted when the plug is moved inwardly to register with the port in said valve, a bell crank lever pivoted adjacent the inner end of said plug, a keeper rigidly secured to said plug and adapted to engage a notch in one arm of said lever to hold the plug in open position, a cam rigidly carried by said rotary valve and adapted to engage under certain conditions one arm of said bell crank lever to force the same out of engagement with said keeper, and a spring for forcing said plug out of port-registering position upon the release of the keeper.

This specification signed this 8th day of June 1925.

RUDOLF LIEFKE.